Patented Oct. 29, 1940

2,219,900

UNITED STATES PATENT OFFICE 2,219,900

MANUFACTURE OF LUMINESCENT SCREENS

Henry Grainger Jenkins, Pinner, and Alfred Hamilton McKeag, Wembley, England, assignors to General Electric Company, a corporation of New York No Drawing. Application October 19, 1938, Serial No. 235,918. In Great Britain November 26, 1937

3 Claims. (Cl. 250—81)

This invention relates to the manufacture of luminescent screens of the type in which the luminescent material is applied to the surface to be coated in the form of fine powder and, after the removal of any excess, attached permanently to it, for example by the dispersion or consolidation of a binder with which the surface was coated before the application of the powder. The term luminescent "screen" means any solid surface coated with luminescent material in such a way that the material may be excited to luminescence by a suitable agency to which the screen is exposed. The screens more especially concerned are the internal surfaces of the glass envelopes of discharge devices.

One of the main difficulties in manufacture of the type specified is to bring the luminescent material into, and to maintain it in, a state in which a thin uniform layer of the material can be formed. Many materials, whose individual particles have excellent luminescent properties, are unsuitable for the manufacture of screens, because the particles adhere to each other and readily form aggregates which will not yield a thin uniform layer. Again, when a screen has to be coated with a mixture of two or more luminescent materials, it is often found that the components of the mixture separate during the said manufacture so that, in the final screen, they are not everywhere present in the same proportion. The object of the invention is to make these difficulties less serious.

According to the invention, manufacture of the type specified comprises, prior to the application of the said luminescent material to the said surface, the steps of mixing the finely divided material intimately with a suitable amount of phosphoric acid and with enough liquid to form a paste of suitable consistency, drying the resulting paste, grinding the resulting cake and treating the resulting powder (for example, by sieving) so as to eliminate the coarser particles.

A suitable size for the said finely divided material is 20 microns diameter. A suitable proportion of phosphoric acid to luminescent material is ½ to 1%; the amount of liquid is preferably that which gives a thick paste. The preferred liquid is water in which the required amount of phosphoric acid is dissolved, and no advantage is known in adopting any other method. If it is adopted, the strength of the solution which both gives the desired consistency to the paste and introduces the required amount of phosphoric acid will generally be found to be about 5%. The drying must be very complete and may be conducted for one hour at 200° C.; a suitable sieve is one of 240 mesh.

The luminescent materials to which this treatment may be applied successfully include the known luminescent silicates and tungstates. But it may be applied to any others which are not seriously attacked chemically by the dilute phosphoric acid. If a mixture of several luminescent materials is to be applied to the surface, they must be thoroughly mixed together before or during the formation of the paste with the phosphoric acid solution; for success in preventing separation of the components apparently depends on the fact that each particle resulting from grinding the caked paste contains all the component materials in approximately the same proportion. It would therefore be useless to mix the materials after the formation of the cake from the dried paste.

We are aware that it has been proposed to use phosphoric acid for binding luminescent materials to a glass support. It is to be observed that, in so far as phosphoric acid used according to the invention binds anything, it binds the particles of the luminescent material to each other, not to the support. Phosphoric acid may be used also, in manufacture according to the invention, to bind the luminescent material to a glass support, but other known binders may all be used for that purpose.

Having now particularly described and ascertained the nature of our said invention and in what manner the same is to be performed, we declare that what we claim is:

1. A method of manufacturing luminescent screens which comprises, prior to the application of the luminescent material to a supporting surface, the steps of forming a paste of the finely divided luminescent material with a solution comprising phosphoric acid in an amount equal to about ½ to 1 per cent of the luminescent material, the strength of the said solution being of the order of five per cent, drying the said paste, grinding the resulting cake, and eliminating the coarser particles from the resulting powder.

2. A method of manufacturing luminescent screens which comprises, prior to the application of the luminescent material to a supporting surface, the steps of forming a paste of the finely divided luminescent material with a solution of phosphoric acid dissolved in water, the amount of phosphoric acid being about ½ to 1 per cent of the luminescent material and the strength of the solution being of the order of five per cent, drying the said paste, grinding the resulting cake, and eliminating the coarser particles from the resulting powder.

3. A method of manufacturing luminescent screens which comprises, prior to the application of the luminescent material to a supporting surface, the steps of intimately mixing the finely divided luminescent material with about ½ to 1 per cent of phosphoric acid and with enough of a volatilizable liquid to form a thick paste and produce a homogeneous mixture of the phosphoric acid and luminescent material, the said liquid being one which does not react with the phosphoric acid or the luminescent material, drying the said paste by volatilizing said liquid, grinding the resulting cake, and eliminating the coarser particles from the resulting powder.

HENRY GRAINGER JENKINS.
ALFRED HAMILTON McKEAG.